US010173380B2

(12) United States Patent
Groetzschel

(10) Patent No.: US 10,173,380 B2
(45) Date of Patent: Jan. 8, 2019

(54) ARCUATE FIBER COMPOSITE PLASTIC PREFORM AND METHOD FOR PRODUCTION OF CURVED PROFILES

(71) Applicant: Cotesa GmbH, Mittweida (DE)

(72) Inventor: Georg Groetzschel, Moritzburg (DE)

(73) Assignee: Cotesa GmbH, Mittweida (DE)

( * ) Notice: Subject to any disclaimer, the term of this patent is extended or adjusted under 35 U.S.C. 154(b) by 0 days.

(21) Appl. No.: 15/598,733

(22) Filed: May 18, 2017

(65) Prior Publication Data

US 2018/0304559 A1 Oct. 25, 2018

(51) Int. Cl.
B32B 5/12 (2006.01)
B29C 70/46 (2006.01)
B29K 105/08 (2006.01)
B29L 31/00 (2006.01)

(52) U.S. Cl.
CPC ........ B29C 70/46 (2013.01); *B29K 2105/089* (2013.01); *B29L 2031/7739* (2013.01); *Y10T 428/24058* (2015.01)

(58) Field of Classification Search
CPC ..... Y10T 428/24058; Y10T 428/24124; Y10T 428/24653; Y10T 428/24669; Y10T 428/24694; B32B 37/10; B29C 70/30; B29C 70/44; B29C 70/345; B29C 70/462
USPC .......................................................... 428/80
See application file for complete search history.

(56) References Cited

U.S. PATENT DOCUMENTS 7,943,076 B1 5/2011 Hawkins et al.
8,911,580 B2 12/2014 Law et al.
2006/0169396 A1 8/2006 Joern 2007/0138695 A1 6/2007 Krogager
2009/0261199 A1 10/2009 McCarville et al.
2012/0027989 A1 2/2012 Nishiyama et al.

FOREIGN PATENT DOCUMENTS

| DE | 102 50 826 A1 | 5/2004 |
|----|---------------|--------|
| EP | 2 233 625 A1 | 9/2010 |
| EP | 2 596 942 A1 | 5/2013 |
| ES | 2 314 581 T3 | 3/2009 |
| WO | WO 2009/049737 A1 | 4/2009 |
| WO | WO 2012/046020 A1 | 4/2012 |

OTHER PUBLICATIONS

Spanish Search Report dated Mar. 6, 2018 with respect to counterpart Spanish patent application 201730695.
Translation of Spanish Search Report dated Mar. 6, 2018 with respect to counterpart Spanish patent application 201730695.

*Primary Examiner* — Alexander S Thomas
(74) *Attorney, Agent, or Firm* — Ursula B. Day

(57) ABSTRACT

An arcuate fiber composite plastic preform and a method for the production of curved profiles with any fiber layer structure are disclosed, which include a layered fiber structure with a base and an arcuate outer contour, an inner edge and an outer edge. The fiber layer structure is configured with a first inner area provided with elevations and depressions, a second adjacent central area with no elevations and depressions and a third outer area and provided with radially oriented open recesses. The method of producing curved profiles from fiber composite plastic preforms having any fiber layer structure includes a molding step, whereby the outer area of the preform with wedge-shaped recesses is being compressed while the inner relief-shaped area is being completely stretched thereby flattening the relief.

7 Claims, 4 Drawing Sheets

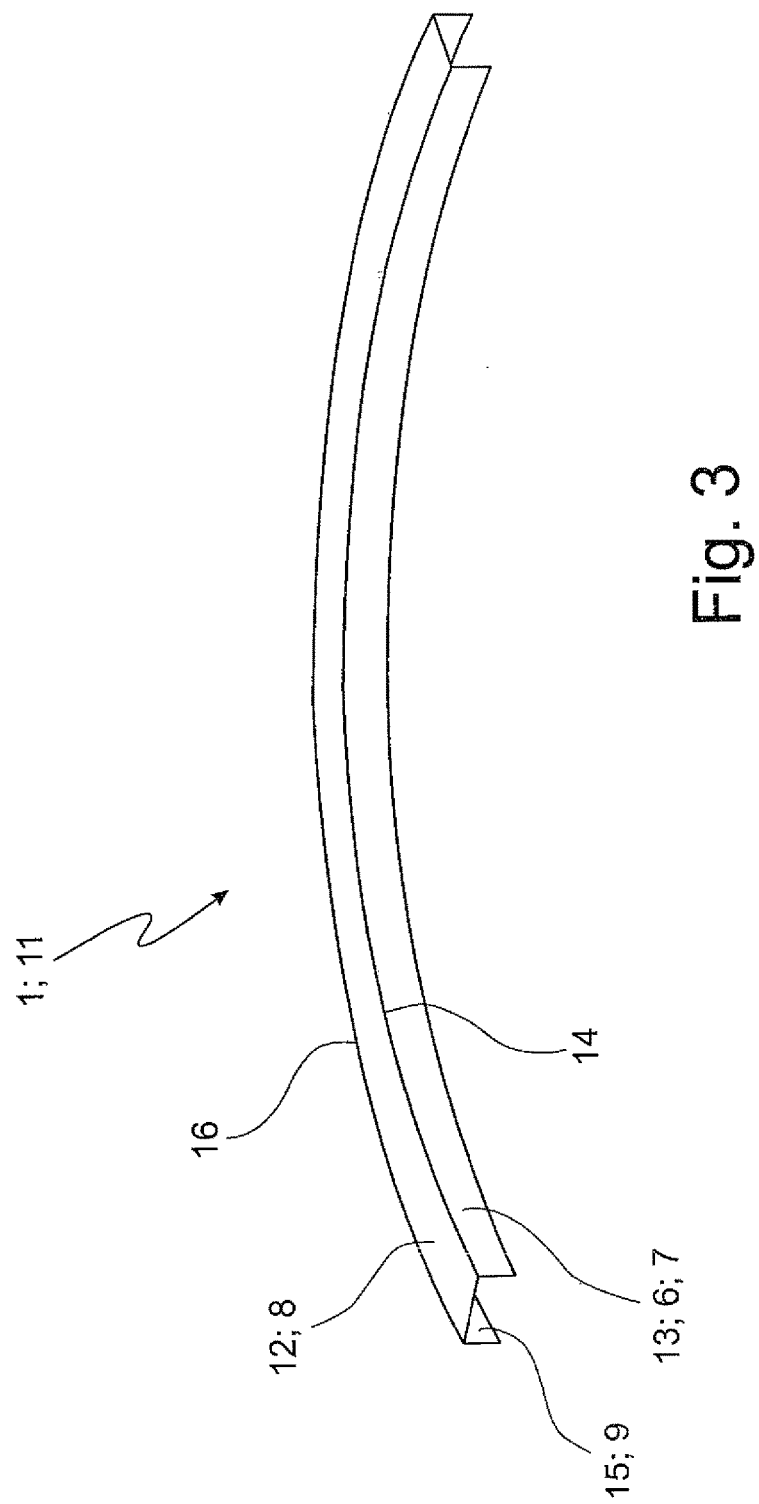

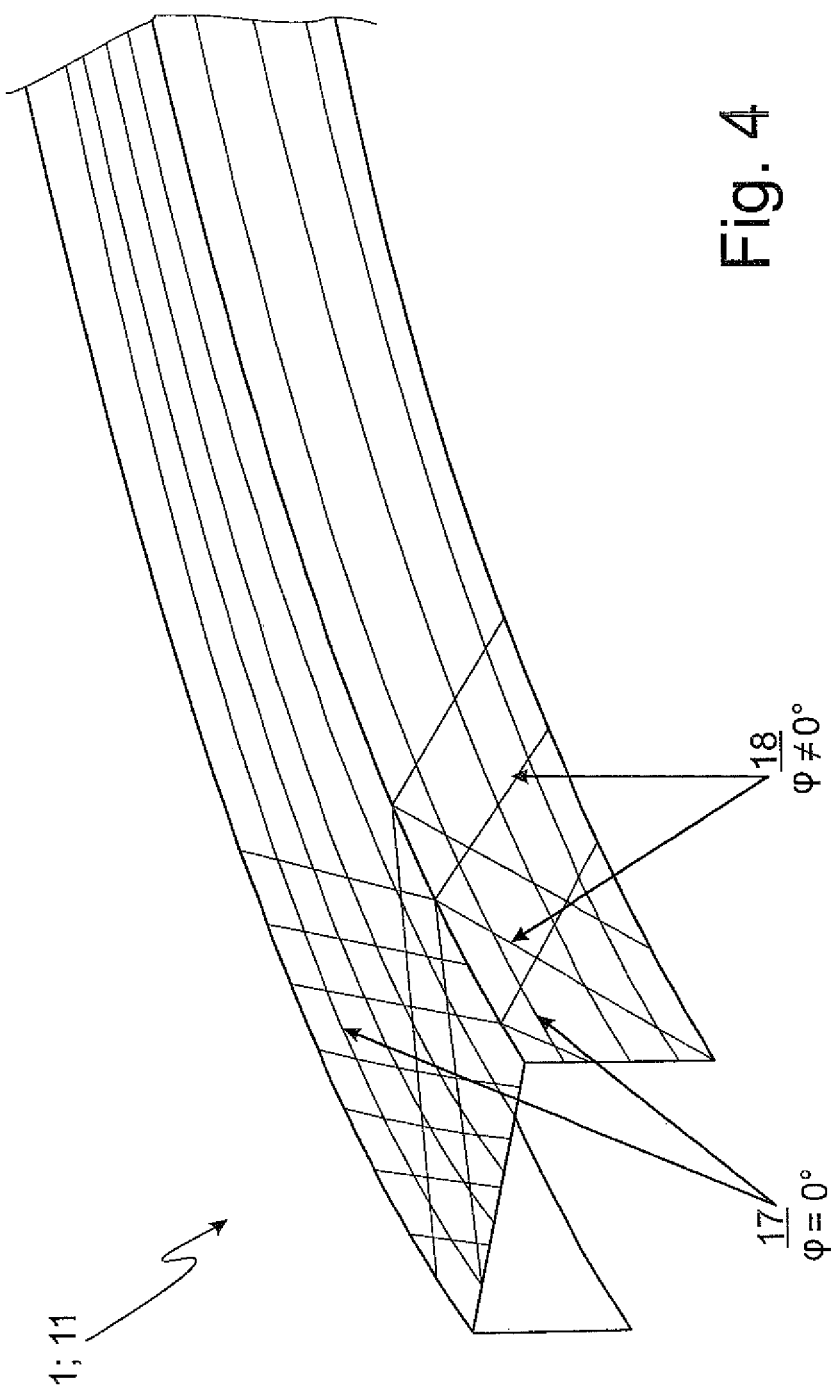

ARCUATE FIBER COMPOSITE PLASTIC PREFORM AND METHOD FOR PRODUCTION OF CURVED PROFILES

CROSS-REFERENCES TO RELATED APPLICATIONS

This application claims the priority of German Patent Application Serial No. 10 2016 109 284.3, filed May 20, 2016, pursuant to 35 U.S.C. 119(a)-(d), the subject matter of which is incorporated herein by reference.

BACKGROUND OF THE INVENTION

The present invention refers to a fiber composite plastic preform for the manufacture of curved profiles with any fiber layer structure. The invention further refers to a method for producing curved profiles from fiber composite plastic with any fiber layer structure.

The production of curved profiles from fiber composite plastic (FVK) with a profile-directed fiber coordinate system, such as a system including a 90° ordinate to the profile curve and a 0° abscissa tangential to the curved profile, represents a great production challenge. Due to increased requirements regarding the fiber content and the demand for high quality parts in the field of aircraft primary structures, the use of FVK-preforms that are provided in either so-called "prepregs" or as non-impregnated semi-finished fiber products, are considered standard. These fiber layered structures can be brought into the desired shape via a hot forming process. Prepregs are semi-finished textiles pre-impregnated with reaction resin, for manufacture of construction parts that are hardened under heat and pressure.

Upon forming the fiber layers, due to the changes of the radius of the molded arcuate segments, "stretching" or "compression" of the material inevitably happens, which requires a length compensation within the single fibers layers. In layers with a fiber angle of $\varphi \neq 0°$, this is carried out through a selective shift of the single fibers. Changes in the arch length are then balanced through "spreading apart" or "pushing together" of a portion perpendicular to the fiber direction. In the case of a pushing together, a correspondingly stretched deposit of angled layers must be taken into account. For fiber layers with $\varphi=0°$, this solution is not applicable, although these profile-directed fiber layers are oftentimes of considerable relevance for structural parts.

According to the prior art, the problem with forming fiber layers with $\varphi \neq 0°$ can be avoided or can be solved in a variety of ways.

In a first variant, there is a substitution of the fiber layers $\varphi=0°$ with fiber layers $\varphi=0°$ while raising the number of layers for the desired firmness. Avoiding the fiber angle $\varphi=0°$ however leads to disadvantageous limitations in the layered structure of the laminate. The desired firmness of the structural part thus can be realized only through a corresponding increase of the number of layers with a fiber angle of $\varphi \neq 0°$. This leads necessarily to an increase in weight which is especially disadvantageous in aircraft construction. The stretching of fiber layers transverse to the fiber direction can result in so-called "gaps" of an undue size between the fibers.

According to a second variant of the prior art, a deposit of single fiber layers with $\varphi=0°$ directly in the profile cross section, that is, in a three-dimensional layer deposit, a subsequent forming for that layer is omitted. Depositing fiber layers with $\varphi=0°$ directly in the profile cross section results in a complex production technique and expenditure requiring a large portion of manual steps for single layer deposits or, alternatively, requires a very costly mechanical process. Also, a manual lamination process is less reproducible and less cost effective. This approach runs counter to the goal of automatization and industrializing the production process.

For example, U.S. Pat. No. 7,943,076 describes a method for the production of a curved composite material structural part which includes such steps as:

providing a multitude of composite material band segments;

connecting a group of, band segments into a layer which retains this group at the layer edges within a flexible frame;

positioning the connected groups of band segments against a first curved tool surface of a mold;

contacting the connected groups of band segments with a second, generally flat tool surface of the mold;

contacting the connected groups of band segments with a third curved tool surface of the mold; and hardening the layer.

In the example, the group of band segments, starting from a smaller radius of the curvature, can be formed with a curvature of a larger radius. The method thus exploits a wavy mold surface of an additional transitional mold, in order to transition the group of band segments into an intermediate shape. For this purpose, the transitional mold includes different mold surfaces, of which some are provided with a wave pattern formed of alternating ribs and valleys. These wave patterns are utilized to preform the prepreg into an intermediate shape whereby this intermediate shape then can be easily formed by a mold using a molding machine. The area of the prepreg that is being preformed by a first mold surface of the transitional mold is being placed against the smaller inner radius of the mold, the first curved mold surface. An adjacent area which is being preformed by a second mold surface of the transitional mold tool, and an outer cap that is being preformed by a third mold surface of the transitional mold, are formed via the mold of the molding machine.

In the foregoing variant, the forming work is considerable, since depending on the specific profile shape, successive forming of more than one edge is required. Since a specific forming tool is required, the process is thus not cost effective. In addition, such a multistep forming process can result in unwanted shifts of the fiber layers which will also have a negative impact on the reproducibility and the quality of the structural part. Due to the high degree of forming, a wave shaped structure requires a production dependent unfavorably high degree of forming wave shapes. Upon positioning connected groups of band segments against the first curved surface of a mold, in particular, groups of great thickness and a tool surface with a small curve radius, unwanted fiber compression can hardly be avoided.

It would therefore be desirable and advantageous to provide an improved production method to obviate prior art shortcomings and to provide an efficient and reproducible production method for high quality curved fiber composite profiles and to realize all types of layer structures with the aid of simple standard production methods.

The present invention resolves prior art problems of multistep processes by providing a prefabricated preform that already includes the complete fiber layer structure of the later profile and by means of the defined relevant areas can be advantageously transitioned into the profile in a one-step process.

SUMMARY OF THE INVENTION

According to one aspect of the present invention, a preform curved fiber composite plastic preform for the production of curved profiles includes a fiber layer structure forming a plane or arched base with an arcuate outer contour, wherein the contour is bordered by front ends, an inner edge, whose curvature faces the center of the curve and an outer edge, whose curvature faces away from the curve. Starting from the inner edge, the preform includes a first inner area, whose surface includes a relief structure along the extent of the curve with bumps and valleys vertical to the base and starting from the first inner area, and adjacent; a second central area as a base area without any bumps and valleys vertical to the base; and starting from the base area, extending outward and adjacent to the outer edge, a third outer area having open recesses radially oriented toward the outer edge.

In another aspect of the present invention, the fiber composite plastic-preform which is suitable for the production of curved profiles from fiber composite plastic (FVK) includes:

a plane or slightly convex base;

any fiber layer structure with an arcuate outer contoured edge and two front ends, an inner edge with a curvature facing the center of the curve and the outer edge curvature facing away from the curve;

three areas;

a first inner area—starting from the inner edge and configured as a stretching area with a relief structure extending along the course of the curve with elevations and depressions arranged perpendicular to the base such that the relief structure provides the exact fiber length for the subsequent forming of this area when the stretching area is stretched and the relief flattened.

a second area—starting from the first inner area extending to the outer adjacent central area as the base area, and serving as a deck area at the subsequent forming of the profile, is itself not being formed; and a third outer area—starting from the base area outward adjacent and extending toward the outer edge which is provided with recesses that are open toward the outer edge and thus acting as a compression area for the subsequent forming necessary compression of this area.

According to an advantageous embodiment of the present invention, the first inner area is coordinated with the target profile to be produced, such that the relief structure incorporates an exact surface that corresponds to a surface formed by the inner area in the curved target-profile when the relief structure is stretched and flattened. Especially preferred is a wavy relief structure having elevations and depressions.

Preferably, recesses are arranged distanced in regular intervals along the outer edge. According to an advantageous embodiment the recesses are wedge shaped.

The present invention includes a prefabricated preform which incorporates the entire fiber structure of the subsequent profile and, through the configuration of the different areas according to the present invention, can be advantageously transitioned into a profile in a single step.

Advantageously, the fiber layer structure can have fiber layers with any chosen fiber orientations of unidirectional fiber segments. In particular, the unlimited combination of the structurally most relevant fiber angles φ=0° with φ=45°, φ=−45° and φ=90°, permits also partial fiber layers.

A further aspect of the present invention refers to a method for the production of a curved profile from fiber composite plastic (FVK) while using a FVK preform according to the present invention and a mold. The mold tool forms the inner surface of the formed profile comprising an arcuate surface and perpendicularly or obliquely thereto the adjacent cheek surfaces. Thus, the inner cheek surface is curved concavely and the outer cheek surface curved convexly. Instead of utilizing a separate mold, the hardening mold can conveniently serve as the mold tool.

The method includes the following successive method steps:

In a first step a) placing the fiber composite plastic preform such that the base area as the deck area is positioned flush with the contact surface of the mold tool, wherein the adjacent areas—which are the inner area with a relief structure acting as a stretching area, and the outer area with wedge-shaped recesses acting as a compression area—protrude beyond the deck surface of the mold tool;

In a subsequent step b) engaging the outer protruding compression area of the FVK preform with the outer cheek of the mold tool, such that the wedge-shaped recesses of the compression area are closing, and engaging the inner protruding stretching area of the FVK-preform with the inner cheek of the mold tool, whereby the inner relief-shaped stretching area is being completely stretched and the relief flattened. Engaging each of the cheek surfaces is carried out in either one simultaneous step or in subsequent steps in any order.

The present invention provides several marked advantages for an industrial method as compared to those known in the prior art. These are among others:

Incorporation of the entire fiber layer structure in a single FVK preform to be formed, an advantageous production of the FVK preform with simple standardized method steps on a plane or slightly curved base area, such as for example with an automated fiber positioning system (AFP-system), a surprisingly simple further processing, that is, forming by standard forming methods in which the entire fiber layer structure can be formed in a one step method without the necessity of using complex mold tools or complex molding machines, a variable fiber layer structuring without any production-related or required conditions, thus allowing for an optimal exploitation of fiber composite materials and surprisingly good results for forming them, and surprisingly good forming results without unwanted impact of the fiber orientation such as for example, distortion of the fiber angles.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a schematic illustration of a three-dimensional curved profile from fiber composite plastic (FVK) having an exemplified target geometry after forming, and FIG. 4 is a schematic illustration of a layer structure of a three-dimensional curved profile.

DETAILED DESCRIPTION OF PREFERRED EMBODIMENTS

Figure 1:
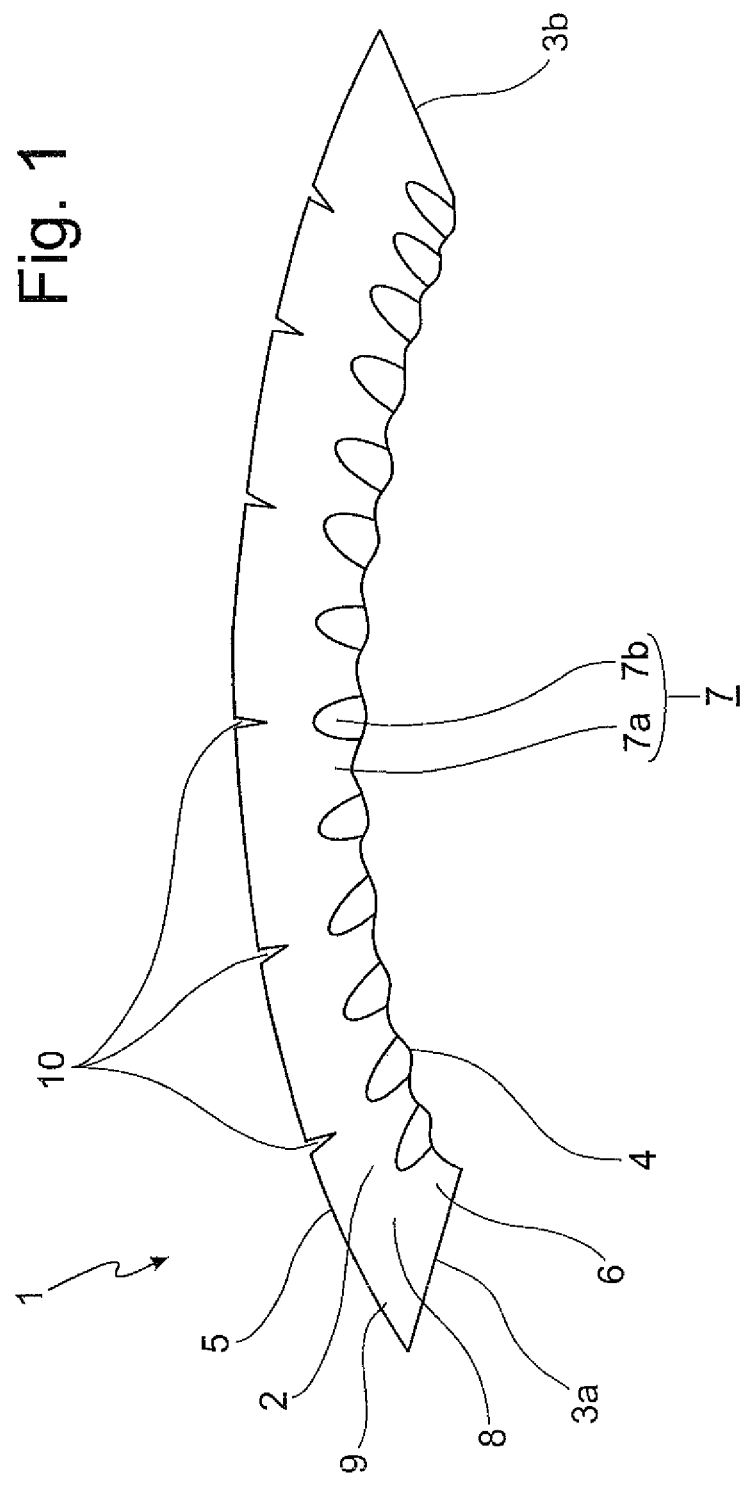
FIG. 1 is a FVK preform for the production of curved profiles from fiber composite material plastic (FVK) with profile-directed fiber coordinating system according to the present invention.

Throughout all the Figures, same or corresponding elements are generally indicated by same reference numerals.

Turning now to the drawing, and in particular to FIG. 1, there is shown an arcuate FVK-preform 1 for the production of curved profiles from fiber composite plastic FVK with a profile-directed fiber coordinate system. A profile-directed fiber coordinate system means that the abscissa of the fiber coordinate system is oriented parallel to the tangent of the profile line, in the shown example the curvature of the arcuate preform 1, and the ordinate extends correspondingly vertical, that is, 90° thereto, with both located in the base area 2.

Thus, the arcuate preform 1 exhibits a variable fiber layer structure, forming a base 2 with an arcuate outer contour. The base 2 can be either level or arched. For example, the base 2 can be arched like a cone surface section.

The arcuate outer contour has a front end each, 3a and 3b as well as an inner edge 4 facing the center of the curve and an outer edge 5 facing away from the center of the curve. The preform 1 includes three different areas. A first inner area 6 starting from the inner edge 4 wherein the surface of the inner area 6, along the extension of the curve has a wavy relief structure 7 with elevations 7a and/or depressions 7b and vertical to base 2. Starting from the first inner area 6 and outwardly adjacent, there is a second central area shown as base area 8 without elevations and depressions and vertical to basis area 2. The base area 8 of preform 1 in the shown example is essentially configured two-dimensional, that is, it corresponds to a level base 2. The base area 8 can also be arched like the sector of a cone surface. Starting from the base area 8 outwardly adjacent and extending to the outer edge is a third outer area 9 which is provided with wedge-shaped radially oriented recesses 10 that are open toward the edge 5. The wedge shaped recesses 10 are preferably distanced from each other in even intervals.

Figure 2:
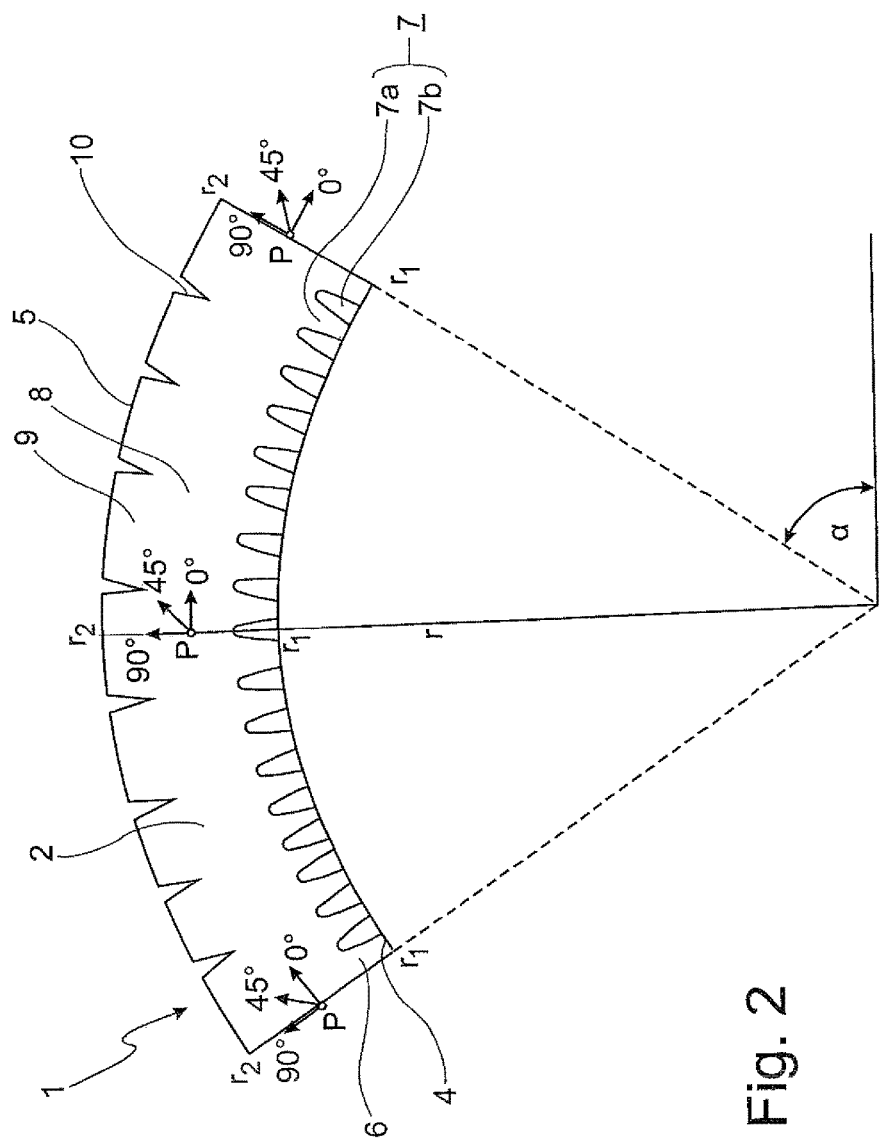
FIG. 2 is a schematic illustration of a FVK preform for the production of curved profiles from fiber composite plastic (FVK) in a polar coordinate system.

Alternative to the illustration in a profile-directed fiber coordinate system, the arcuate FVK preform 1 can be shown in a polar coordinate system as seen in FIG. 2. The definition of local fiber angle is dependent from the position of each viewing point P in the polar fiber coordinate system, which itself is defined by a polar angle $\alpha$ and a radius r. A fiber angle $\varphi$ of $\varphi=0°$ thus corresponds to the tangential direction at each point P, a 90° fiber angle corresponds at point P of the radial direction to point P of the polar coordinate system. All further fiber orientations are derived from that. The description model of the polar fiber coordinate system is applicable at least locally, whereby it is not necessary to apply the same polar coordinate system for the entire arcuate fiber structure, for example, in case there are cracks in the curve of the arcuate form.

The arcuate FVK preform 1 includes—starting from the inner edge 4 which corresponds to a radius r in the polar coordinate system—a first inner area 6, whose surface exhibits a wavy relief structure along the course of the curve of the FVK preform 1 with elevations 7a and/or depressions 7b relative to base 2, in the shown example, relative to the plane of the polar coordinate system. A central area 8 adjacent the first inner area 6, is essentially configured two-dimensional. In the outer area 9, adjacent to the base area 8, the preform 1 has wedge-shaped radially oriented recesses 10 with their openings oriented toward the outer edge 5. The outer edge 5 itself, aside from the recesses 10, has a radius $r_2$.

FIG. 3 shows a three-dimensional curved profile 11 from fiber composite plastic (FVK) with an exemplified target geometry, which is realized through molding of the arcuate FVK preform 1 shown in FIG. 1. The molding is carried out through a process to produce a curved profile from fiber composite plastic (FVK) by using an arcuate FVK preform 1 as shown in FIG. 1 and FIG. 2 and a mold, not shown here. The mold has a curved surface in the shape of a level curve having an outer edge with a larger radius and a greater arch length and an inner curved edge with a smaller radius and smaller arch length. At each of these two edges of the curved surface of the mold follows a downward oriented curved cheek surface, wherein the outer cheek surface at the outer edge is curved convexly and the inner cheek surface at the inner edge is curved concavely.

The method for the production of a curved profile from fiber composite plastic (FVK) according to FIG. 3 includes the following successive method steps:

a) positioning a deck area 12 (See FIG. 3) that corresponds to the base area 8 of the arcuate FVK preform 1 as shown in FIG. 1 and located between the inner area 6 with the relief structure 7 and the outer area 9 with the wedge-shaped recesses 10, on the curved contact surface of the mold that is shaped as a level arch.

b) engaging a stretching area 13 of the FVK preform 1 which corresponds to the inner area 6 with the relief structure 7, with the inner cheek surface of the mold thereby forming an edge 14 between the deck area 12 and the stretching area 13 at an inner edge of the mold, and engaging a compression area 15, which corresponds to an outer area 9 with the wedge-shaped radial recesses 10 with the outer cheek surface of the mold resulting in edge 16 between the deck area 12 and the compression area 15, wherein the contacting at each of the cheek surfaces of the mold takes place in either one step or in several steps in any order.

Thereby, a three-dimensional curved profile 11 is realized, which essentially has an upside down U-shaped cross section.

FIG. 4 refers to a schematic illustration of a layered structure of a three-dimensional curved profile 11 after molding the arcuate FVK preform 1. An advantage of the present invention is that the FVK preform 1 having a variable fiber layer structure can be realized without technological constraints and thus allows an optimal exploitation of the structural properties of fiber composite material. The three-dimensional curved profile 11, as shown in FIG. 4 in schematic representation can be realized with fiber layers from unidirectional fiber segments 17 with a fiber angle $\varphi=0°$, as well as with fiber layers from unidirectional fiber segments 18 with a fiber angle $\varphi\neq0°$. In FIG. 4, the different yet unidirectional fiber layers are schematically illustrated. The definitions for fiber angle $\varphi$ are relative to a profile-directed fiber coordinate system.

While the invention has been illustrated and described as embodied in composite fiber preform according to a coordinate system, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An arcuate fiber composite plastic preform for the production of curved profiles comprising,
   a fiber layer structure forming a plane or curved base with an arcuate outer contour bordered by front ends, an inner edge with a curvature facing a center of a curve and an outer edge with a curvature facing away from the curve, said fiber layer structure configured with, a first inner area, starting from the inner edge, with a surface including a relief structure along an extent of the curve with elevations and depressions vertical to the base, a second area starting from the first inner area and extending outward to an adjacent central area as a base and void of elevations and depressions, and a third outer area starting from the base extending outward and adjacent the outer edge, said outer edge provided with radially oriented open recesses.

2. The arcuate fiber composite plastic preform of claim 1, wherein the first inner area is coordinated relative to a target curved profile such that the area with the relief structure incorporates a surface that corresponds exactly to an extended surface in the curved profile after the relief structure of the inner area has been stretched and thus flattened.

3. The arcuate fiber composite plastic preform of claim 1, wherein the relief structure is configured with elevations and depressions in a wavy pattern.

4. The arcuate fiber composite plastic preform of claim 1, wherein the recesses along the outer edge are arranged in regularly distanced intervals.

5. The arcuate fiber composite plastic preform of claim 1, wherein the recesses are wedge-shaped.

6. The arcuate fiber composite plastic preform of claim 1, wherein the preform is constructed of a number of fiber layers, each layer including unidirectional fiber segments with a fiber angle $\varphi=0°$, or a fiber angle $\varphi \neq 0°$.

7. A method for the production of a curved profile of fiber composite plastic from the arcuate fiber composite plastic preform according to claim 1 comprising the steps of:

providing a mold having a plane or curved contact surface in the shape of an arch with an outer edge of a radius and a arch length and an inner curved edge of a radius smaller than the outer edge and an arch length smaller than the inner curved edge, wherein each, the inner and outer edge of the contact surface is followed by an oblique or downwardly oriented vertical cheek surface, where an outer cheek surface is curved convexly at the outer edge and an inner cheek surface at the inner edge is concavely curved, placing the fiber composite plastic-preform such that the base area as deck area is positioned flush with the contact surface of the mold, wherein the adjacent areas, which are the inner area with a relief structure acting as a stretching area, and the outer area, with wedge-shaped recesses acting as a compression area, protrude beyond the cover surface of the mold;

engaging the outer protruding compression area of the preform with the outer cheek surface of the mold, such that the wedge-shaped recesses of the compression area are closed and engaging the inner protruding stretching area of the preform with the inner cheek surface of the mold, wherein the inner relief-shaped stretching area is being completely stretched and thus flattened; wherein engaging the cheek surfaces is carried out in either one step at once or in subsequent steps in any order.

* * * * *